United States Patent [19]

Nyu et al.

[11] Patent Number: 6,025,945
[45] Date of Patent: Feb. 15, 2000

[54] OPTICAL TRANSMITTER/RECEIVER AND A NETWORK USING SUCH OPTICAL TRANSMITTER/RECEIVERS

[75] Inventors: Takayuki Nyu; Shuntaro Yamazaki; Takeshi Nagahori, all of Tokyo, Japan

[73] Assignee: NEC Corporation, Tokyo, Japan

[21] Appl. No.: 08/895,575

[22] Filed: Jul. 16, 1997

[30] Foreign Application Priority Data

Jul. 19, 1996 [JP] Japan .................................. 8-190743

[51] Int. Cl.[7] .......................... H04B 10/00; H04B 10/08; H04B 10/02
[52] U.S. Cl. .......................... 359/152; 359/152; 359/110; 359/163; 359/177; 385/53
[58] Field of Search .................................... 359/152, 110, 359/163; 385/53

[56] References Cited

U.S. PATENT DOCUMENTS

| 4,004,156 | 1/1977 | Schuller ................................. 307/113 |
| 4,654,890 | 3/1987 | Hasegawa et al. ..................... 455/607 |
| 5,615,033 | 3/1997 | Yoshida et al. ........................ 359/110 |
| 5,768,279 | 6/1998 | Barn et al. .............................. 370/486 |

OTHER PUBLICATIONS

IEEE Standard for a High Performance Serial Bus, IEEE Std 1394–1995, Aug. 30, 1996, pp. 83, 85 and 98 pp. 83, 85 and 98.

*Primary Examiner*—Jason Chan
*Assistant Examiner*—Mohammad Sedighian
*Attorney, Agent, or Firm*—Sughrue, Mion, Zinn, Macpeak & Seas, PLLC

[57] ABSTRACT

An optical transmitter/receiver transmits and receives optical signals between terminal devices of a network which are connected by a twisted pair cable with a feeder line. The optical transmitter/receiver has an electric connector for connection to the twisted pair cable, a peak holding circuit for detecting whether there is an optical signal in an optical fiber based on an output signal from an optical receiver, and a biasing circuit for applying a bias voltage to the twisted pair cable. The biasing circuit applies a bias voltage to a twisted pair of the twisted pair cable if there is an optical signal in the optical fiber, and stops the application of the bias voltage to the twisted pair if there is no optical signal in the optical fiber. The terminal devices are capable of detecting insertion or removal of the twisted pair cable or the optical fiber.

22 Claims, 6 Drawing Sheets

OPTICAL TRANSMITTER/RECEIVER AND A NETWORK USING SUCH OPTICAL TRANSMITTER/RECEIVERS

BACKGROUND OF THE INVENTION

1. Field of the Invention

The present invention relates to an optical transmitter/receiver for transmitting and receiving optical signals between terminal devices of a network in which a plurality of devices are connected by a serial bus, and a network with such optical transmitter/receivers. The serial bus comprises high-speed serial buses standardized according to IEEE (The Institute of Electrical and Electronics Engineers) 1394.

2. Description of the Prior Art

There has in recent years been a demand for the transfer of a large amount of data between terminal devices in view of increased processing capability of computers and in order to meet growing demands for the processing of a large amount of data such as moving image data.

Figure 1:
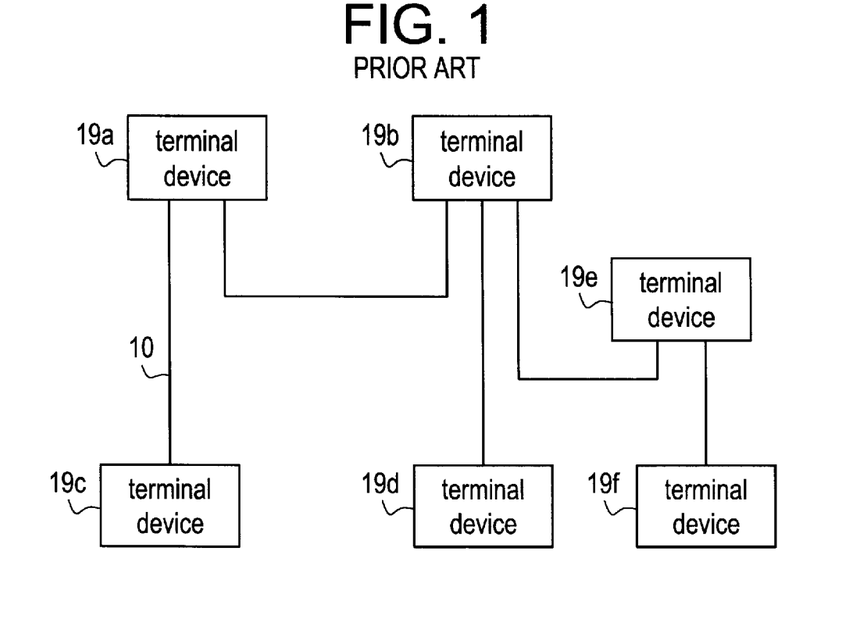
FIG. 1 is a block diagram of a network which employs a serial bus comprising a twisted pair cable with feeder lines.
Figure 2:
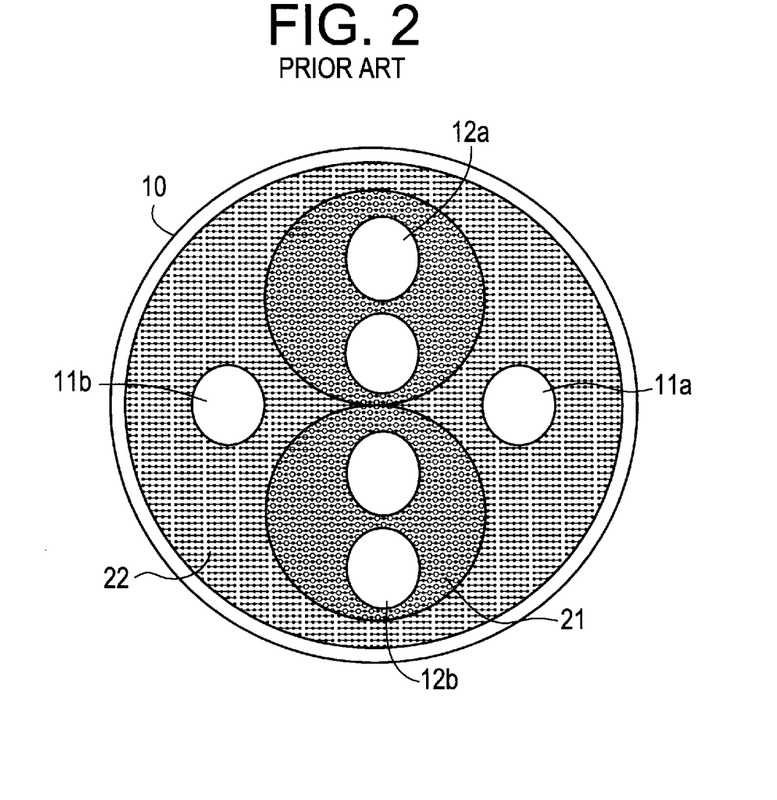
FIG. 2 is a cross-sectional view of the twisted pair cable.

FIG. 1 of the accompanying drawings illustrates a network which employs a serial bus comprising a twisted pair cable with feeder lines. FIG. 2 of the accompanying drawings shows the twisted pair cable with feeder lines in cross section. As shown in FIG. 1, the network has a daisy chain configuration in which some of terminal devices 19a~19f serve as repeaters and a branch structure in which three signal lines are connected to the terminal device 19b. The daisy chain configuration is disadvantageous in that when the power supply of the terminal device 19e is turned off, the terminal device 19f is separated from the network and cannot communicate with the other terminal devices. This shortcoming can be alleviated by connecting the terminal devices with a twisted pair cable which comprises transmission lines and feeder lines, so that a physical layer of a terminal device whose main power supply is turned off is supplied with electric energy from another terminal device through the feeder lines for allowing all the terminal devices to communicate with each other.

One twisted pair cable is shown in FIG. 2. As shown in FIG. 2, a twisted pair cable 10 comprises two feeder lines 11a, 11b and two twisted pairs 12a, 12b each insulated by a shield 21. The insulated twisted pairs 12a, 12b and the feeder lines 11a, 11b are insulated together by a shield 22.

In the network shown in FIG. 1, a bias voltage is applied to the twisted pairs at each of the terminal devices and monitored between the terminals for detecting whether the twisted pairs are inserted or pulled out. A detected signal is used as a sign to start initializing the network.

Signals present on a transmission line include two signals, i.e., a signal for bus management (hereinafter referred to as an "arbitration signal") and a data signal, and are time-division-multiplexed for transmission over the transmission line. The transmission line comprises two twisted pairs. The arbitration signal comprises a two-sequence ternary signal using three voltage levels (logic 0, Z, 1), and can transmit a maximum of 9 arbitration signal levels. The data signal comprises a two-sequence binary signal having two voltage levels (logic 0, 1). One of the two sequences of the data signal is a strobe signal generated from a data signal and a clock signal.

The network with the twisted pairs as the transmission line has a problem in that if the transmission rate is increased, the loss over the transmission line is increased, so that the transmission line can be used only for communications over a short distance. Therefore, the area covered by the network is small and limited. Long-distance communications are made possible by using a plurality of repeater terminals, which however increases the cost of the network.

Another approach for long-distance communications is to use optical fibers as the transmission line for an increased transmission range. Conventional optical repeaters which have only a function of repeating electric and optical signals fail to transmit over optical fibers the bias voltage that is applied to the twisted pairs for detecting whether the transmission line is inserted or pulled out. Therefore, when those conventional optical repeaters are used, it is impossible to detect insertion and removal of the transmission line between the terminal devices. In addition, if a duplex optical fiber is employed, then it is necessary to convert the two-sequence ternary and binary signals that are time-division-multiplexed into a one-sequence binary signal.

Arbitration is carried out by causing arbitration signals from opposite terminals to collide with each other and the terminals detecting the voltage level on the cable. If an optical repeater is used, then it is necessary to recognize an arbitrary signal outputted by a terminal based on the voltage level on the cable and to transmit the recognized arbitrary signal as an optical signal. However, no optical transmitter/receiver capable of performing such a function has been available.

SUMMARY OF THE INVENTION

It is therefore an object of the present invention to provide an optical transmitter/receiver for transmitting and receiving optical signals between terminal devices of a network which are connected by twisted pairs with feeder lines.

Another object of the present invention is to provide a network using such optical transmitter/receivers.

According to the present invention, there is provided an optical transmitter/receiver adapted to be connected to a terminal device by a twisted pair cable with a feeder line, for converting an electric signal from the terminal device into an optical signal and transmitting the optical signal over an optical fiber and for converting an optical signal received through the optical fiber into an electric signal and transmitting the electric signal over the twisted pair cable, the optical transmitter/receiver comprising optical signal detecting means for detecting whether there is an optical signal in the optical fiber, and signal line insertion/removal indicating means for detecting insertion or removal of the optical fiber or the twisted pair cable based on a detected signal from the optical signal detecting means, and indicating the detected insertion or removal to the terminal device.

The signal line insertion/removal indicating means may comprise a biasing circuit for applying a bias voltage to a twisted pair of the twisted pair cable if there is an optical signal in the optical fiber and stopping the application of the bias voltage to the twisted pair if there is no optical signal in the optical fiber.

The signal line insertion/removal indicating means may comprise a reset signal generating circuit for generating and applying a reset signal to a twisted pair of the twisted pair cable if there is no optical signal in the optical fiber.

The optical signal detecting means may comprise a peak holding circuit for detecting whether there is an optical signal in the optical fiber based on the electric signal converted from the optical signal received through the optical fiber.

The optical signal detecting means may comprise a counter circuit which is resettable if there is an optical signal in the optical fiber based on the electric signal converted from the optical signal received through the optical fiber, and which effects counting operation if there is no optical signal in the optical fiber and produces an output signal indicating that there is no optical signal in the optical fiber when a count thereof reaches a preset value.

The optical transmitter/receiver may further comprise means for generating a drive voltage based on a DC voltage which is supplied through the feeder line of the twisted pair cable from the terminal device.

The optical transmitter/receiver may further comprise means for converting a two-sequence signal supplied through the twisted pair cable into a one-sequence optical signal for transmission over the optical fiber, and means for converting the optical signal received through the optical fiber into a one-sequence electric signal and converting the one-sequence electric signal into a two-sequence electric signal for conversion over a twisted pair of the twisted pair cable.

According to the present invention, there is also provided a network comprising first and second terminal devices each having an optical transmitter/receiver described above, for optical communications between the first and second terminal devices.

The network may be initialized depending on insertion or removal of a signal line as detected by the optical transmitter/receiver.

With the above arrangement, insertion or removal of the twisted pair cable or the optical fiber can be detected based on whether there is an optical signal in the optical fiber (received optical signal). For example, if there is no received optical signal, then it is assumed that the optical fiber or the twisted pair cable is removed, and such removal is indicated to the terminal device. The terminal device can thus detect insertion or removal of the twisted pair cable or the optical fiber, and produces a reset signal as a sign for initializing the network.

Since insertion or removal of the twisted pair cable or the optical fiber can be detected based on whether there is an optical signal in the optical fiber (received optical signal), a configurational change in the network which has optical fibers as a transmission line can be detected, and the network can be initialized depending on the detected configurational change. Consequently, it is possible to greatly increase a transmission distance for communications over a wide range, using the optical transmitter/receiver.

When the reset signal generating circuit is used, it transmits a reset signal to a terminal device based on the detection of insertion or removal of the twisted pair cable or the optical fiber. Based on the reset signal, the network can be initialized depending on a change in the network caused by the insertion or removal of the twisted pair cable or the optical fiber.

In as much as the network can employ optical fibers as the transmission line of a serial bus composed of twisted pair cables, the network can be constructed over a long distance in a wide range which could not be realized with twisted pair cables only.

The above and other objects, features, and advantages of the present invention will become apparent from the following description with references to the accompanying drawings which illustrate examples of the present invention.

DESCRIPTION OF THE PREFERRED EMBODIMENTS

Figure 3:
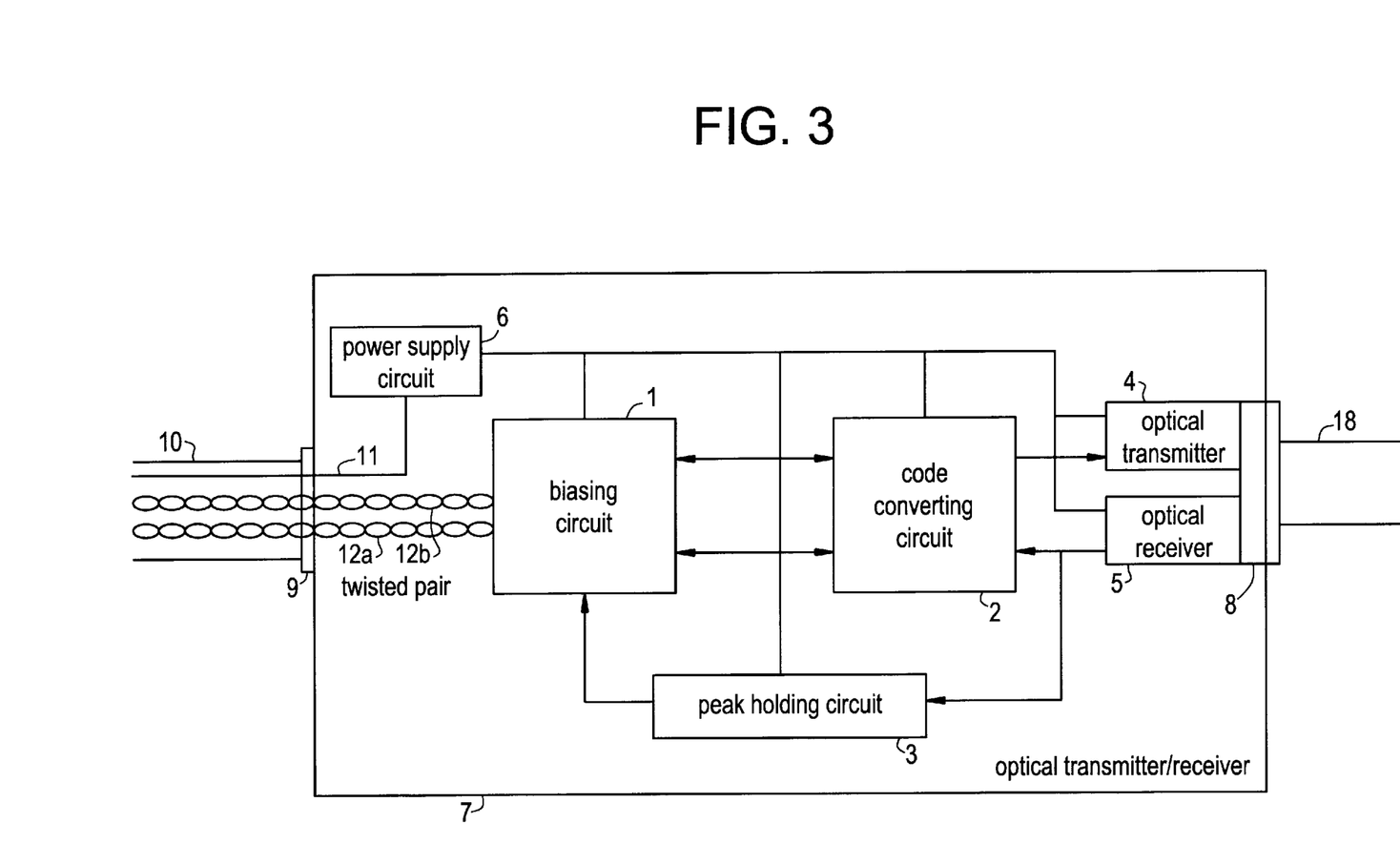
FIG. 3 is a block diagram of an optical transmitter/receiver according to a first embodiment of the present invention.

1st Embodiment:

FIG. 3 shows in block form an optical transmitter/receiver according to a first embodiment of the present invention.

As shown in FIG. 3, an optical transmitter/receiver 7 according to the first embodiment comprises a biasing circuit 1, a code converting circuit 2, a peak holding circuit 3, an optical transmitter 4, an optical receiver 5, a power supply circuit 6, an electric connector 9 to which a twisted pair cable 10 is connected, and an optical connector 8 to which an optical fiber 18 is connected. The twisted pair cable 10 comprises a feeder line 11 and two twisted pairs 12a, 12b.

The optical transmitter 4 converts an electrical signal into an optical signal and transmits the optical signal through the optical connector 8 into the optical fiber 18. The optical receiver 5 converts an optical signal received from a terminal device via the optical fiber 18 through the optical connector 8 into an electric signal and shapes the waveform of the electric signal.

The peak holding circuit 3 has a function to detect whether there is an optical signal on the optical fiber 18 or not. The power supply circuit 6 has a function to convert the level of a DC voltage supplied from the feeder line 11 of the twisted pair cable 10 into a voltage level for use in the optical transmitter/receiver 7.

The biasing circuit 1 is capable of applying a bias voltage to the twisted pairs 12a, 12b based on a detected result from the peak holding circuit 3 which is indicative of whether there is an optical signal on the optical fiber 18 or not. Specifically, if there is an optical signal on the optical fiber 18, the biasing circuit 1 applies a bias voltage to the twisted pairs 12a, 12b, and if there is no optical signal on the optical fiber 18, the biasing circuit 1 stops applying a bias voltage to the twisted pairs 12a, 12b.

The twisted pair cable 10 with the two twisted pairs 12a, 12b can transmit a two-sequence signal. The code converting circuit 2 has a function to convert a two-sequence electric signal into a one-sequence signal so that it can optically be transmitted over the optical fiber 18, and a function to convert an optical signal received from the optical fiber 18 into a one-sequence electric signal and then convert the one-sequence electric signal into a two-sequence electric signal so that they can be transmitted over the twisted pairs 12a, 12b.

The biasing circuit 1 and the code converting circuit 2 will specifically be described below.

Figure 4:
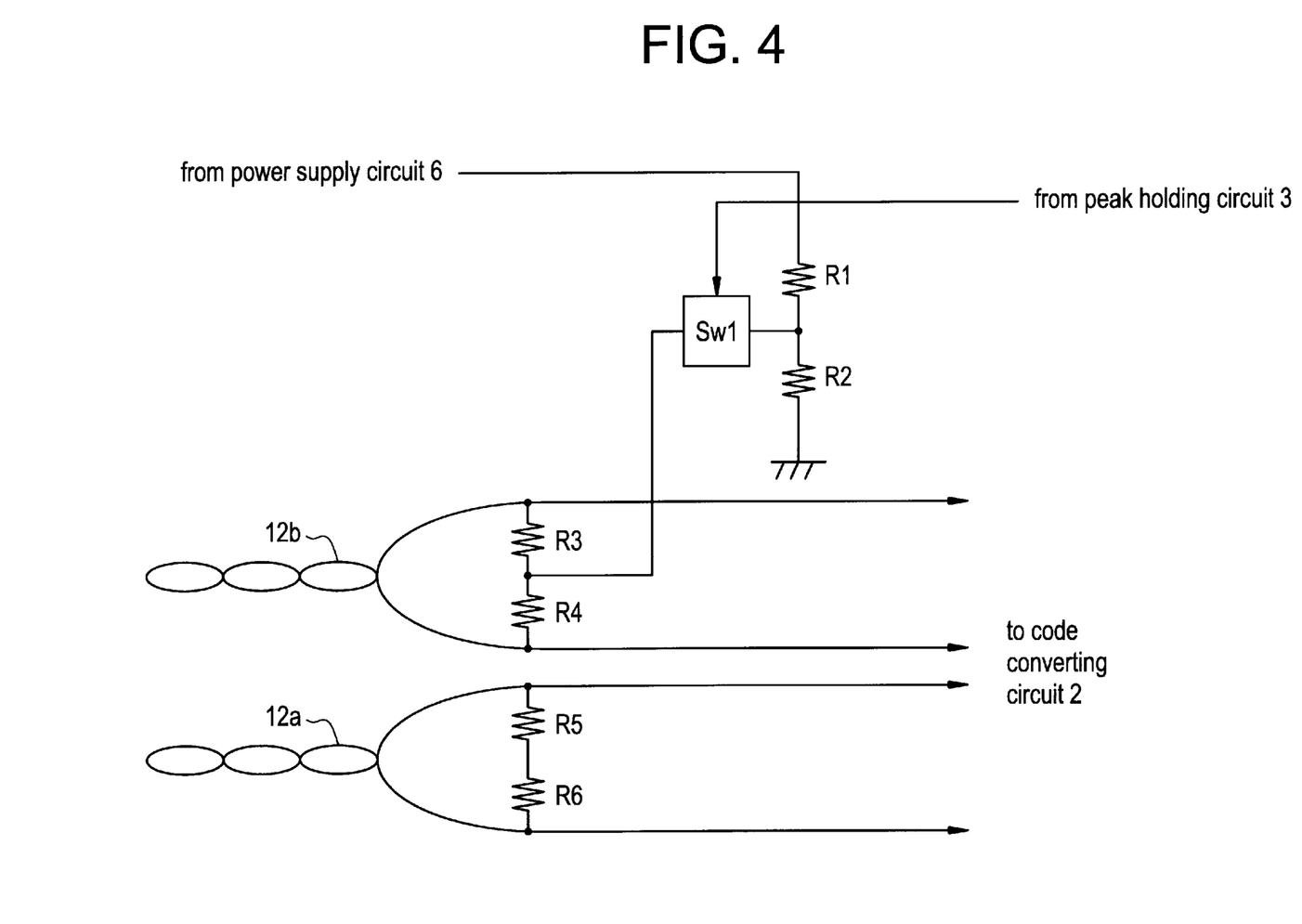
FIG. 4 is a circuit diagram of a biasing circuit of the optical transmitter/receiver shown in FIG. 3.

FIG. 4 shows the biasing circuit 1 by way of example in detail. The biasing circuit 1 divides the voltage from the power supply circuit 6 with resistors R1, R2. The conductors of the twisted pair 12a are connected to each other by series-connected resistors R3, R4. A divided voltage produced by the resistors R1, R2 is applied to the junction between the resistors R3, R4 through a switch SW1. The switch SW1 is controlled on the basis of the detected result from the peak holding circuit 3 which is indicative of whether there is an optical signal on the optical fiber 18 or not. When there is no optical signal on the optical fiber 18, the switch SW1 is opened, applying no bias voltage to the twisted pair 12a.

Figure 5:
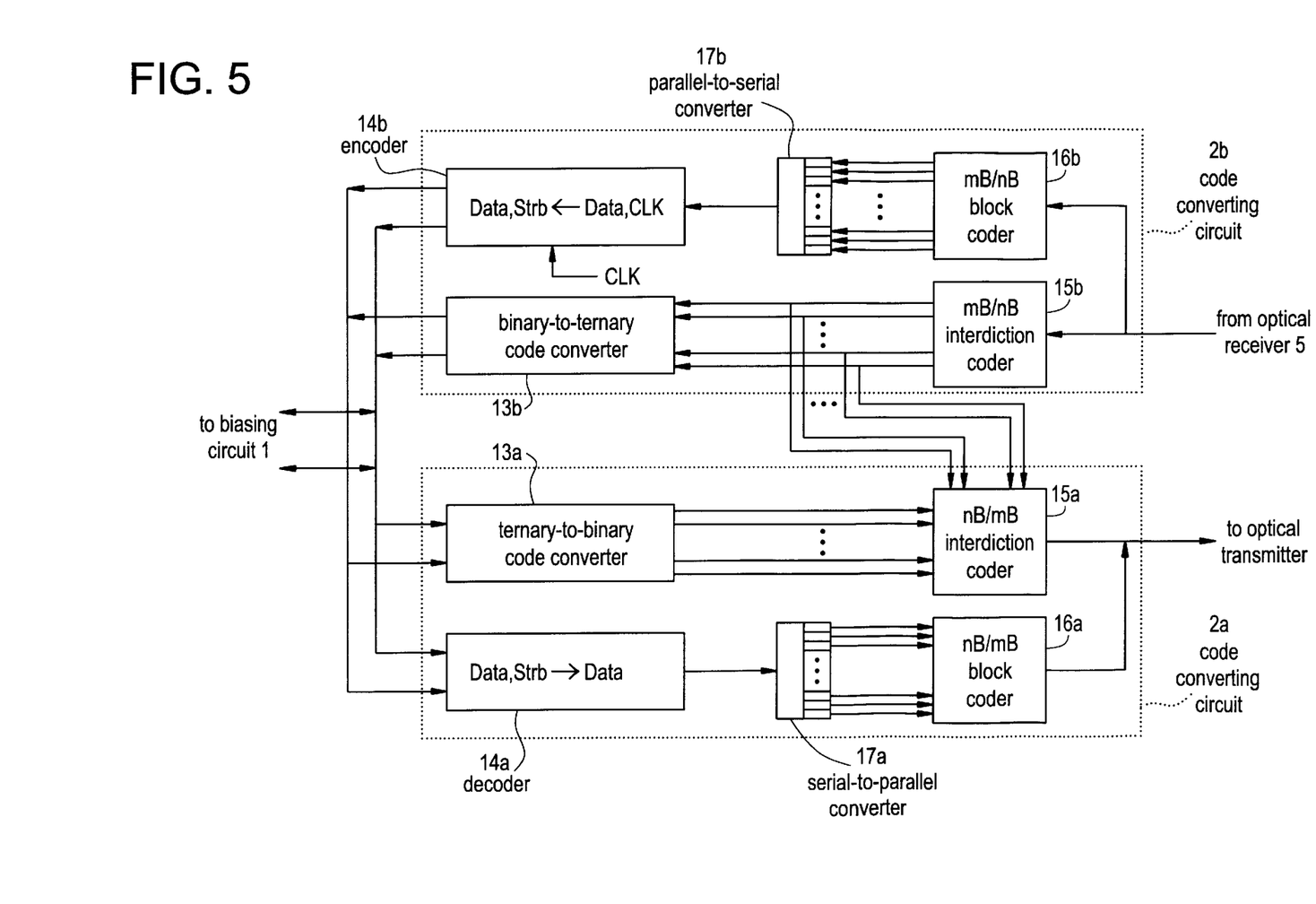
FIG. 5 is a block diagram of a code converting circuit of the optical transmitter/receiver shown in FIG. 3.

FIG. 5 shows the code converting circuit 2 by way of example in detail. As shown in FIG. 5, a ternary arbitration signal and a binary data signal which are time-division-multiplexed are present on the twisted pairs 12a, 12b. The data signal which is transmitted over the twisted pairs 12a, 12b includes data (Data) and a strobe (Strb). The strobe (Strb) is a signal generated by performing an exclusive OR of the data (Data) and a clock signal.

The code converting circuit 2 comprises a code converter 2a for converting a two-sequence signal into a one-sequence signal in order to transmit the two-sequence signal transmitted over the twisted pairs 12a, 12b as an optical signal over the optical fiber 18, and a code converter 2b for converting a one-sequence electric signal converted from a received optical signal into a two-sequence signal in order to transmit the received optical signal as the electric signal over the twisted pairs 12a, 12b.

The code converter 2a comprises a decoder 14a for extracting only the data (Data) from the data signal transmitted over the twisted pairs 12a, 12b, a serial-to-parallel converter 17a for converting the data (Data) extracted by the decoder 14a into an n-bit binary data signal, a block code converter 16a for converting the n-bit binary data signal produced by the serial-to-parallel converter 17a into an m-bit signal, a ternary-to-binary code converter 13a for converting a ternary arbitration signal (represented by three values 1, 0, Z) transmitted over the twisted pairs 12a, 12b into an n-bit two value signal, and an interdiction coder 15a for converting the n-bit binary signal produced by the ternary-to-binary code converter 13a into a code (interdiction code) which has not been used by the block code converter 16a.

The code converter 2a operates as follows:

The decoder 14a extracts only the data (Data) from the data signal, and the serial-to-parallel converter 17a converts the data (Data) into an n-bit binary data signal. The block code converter 16a converts the n-bit binary data signal into an m-bit signal, which is transmitted to the optical transmitter 4. The n-bit binary data signal and the m-bit signal are related to each other such that m>n, and ($2^m - 2^n$) m-bit codes remain unused. For example, the block code converter 16a converts an n-bit binary data signal into an m-bit signal where m=5 and n=4 according to FDDI (Fiber Distributed Data Interface) which is one of protocols used by LAN (Local Area Network). One example of such code conversion is shown in Table 1 below.

TABLE 1

| Data signal (4 bits) 5 | | | | Data signal converted into 5 bits | | | | |
|---|---|---|---|---|---|---|---|---|
| a | b | c | d | a" | b" | c" | d" | e" |
| 0 | 0 | 0 | 0 | 1 | 1 | 1 | 1 | 0 |
| 0 | 0 | 0 | 1 | 0 | 1 | 0 | 0 | 1 |
| 0 | 0 | 1 | 0 | 1 | 0 | 1 | 0 | 0 |
| 0 | 0 | 1 | 1 | 1 | 0 | 1 | 0 | 1 |
| 0 | 1 | 0 | 0 | 0 | 1 | 0 | 1 | 0 |
| 0 | 1 | 0 | 1 | 0 | 1 | 0 | 1 | 1 |
| 0 | 1 | 1 | 0 | 0 | 1 | 1 | 1 | 0 |
| 0 | 1 | 1 | 1 | 0 | 1 | 1 | 1 | 1 |
| 1 | 0 | 0 | 0 | 1 | 0 | 0 | 1 | 0 |
| 1 | 0 | 0 | 1 | 1 | 0 | 0 | 1 | 1 |
| 1 | 0 | 1 | 0 | 1 | 0 | 1 | 1 | 0 |
| 1 | 0 | 1 | 1 | 1 | 0 | 1 | 1 | 1 |
| 1 | 1 | 0 | 0 | 1 | 1 | 0 | 1 | 0 |
| 1 | 1 | 0 | 1 | 1 | 1 | 0 | 1 | 1 |
| 1 | 1 | 1 | 0 | 1 | 1 | 1 | 0 | 0 |
| 1 | 1 | 1 | 1 | 1 | 1 | 1 | 0 | 1 |

The ternary arbitration signal is converted into an n-bit binary signal by the ternary-to-binary code converter 13a. One example of such conversion where n=4 is shown in Table 2 below.

TABLE 2

| Arbitration signal (two-sequence ternary signal) | | Arbitration signal converted into binary signal (4-bit binary signal) | | | |
|---|---|---|---|---|---|
| A | B | a | b | c | d |
| 0 | 0 | 0 | 0 | 0 | 0 |
| 0 | Z | 0 | 0 | 0 | 1 |
| 0 | 1 | 0 | 0 | 1 | 1 |
| Z | 0 | 0 | 1 | 0 | 0 |
| Z | Z | 0 | 1 | 0 | 1 |
| Z | 1 | 0 | 1 | 1 | 1 |
| 1 | 0 | 1 | 1 | 0 | 0 |
| 1 | Z | 1 | 1 | 0 | 1 |
| 1 | 1 | 1 | 1 | 1 | 1 |

The n-bit binary signal is then converted by the interdiction coder 15a into a code (interdiction code) which has not been used by the block code converter 16a. For such conversion, an arbitration signal received from the optical fiber 18 and an arbitration signal transmitted to the optical fiber 18 are taken into account. One example of such conversion where n=4 and m=5 is shown in Table 3 below.

TABLE 3

| Arbitration signal from optical fiber (4 bits) | | | | Arbitraion signal from twisted pairs (4 bits) | | | | Arbitration signal to optical fiber (4 bits) | | | | Arbitration signal determined from the three states and transmitted to optical fiber (5 bits) | | | | |
|---|---|---|---|---|---|---|---|---|---|---|---|---|---|---|---|---|
| a | b | c | d | a | b | c | d | a | b | c | d | a' | b' | c' | d' | e' |
| 0 | 0 | 0 | 0 | 0 | 1 | 0 | 1 | — | — | — | — | 1 | 1 | 1 | 1 | 1 |
|   |   |   |   | 0 | 1 | 0 | 0 | — | — | — | — | 0 | 0 | 1 | 1 | 1 |
|   |   |   |   | 0 | 0 | 0 | 1 | — | — | — | — | 0 | 0 | 1 | 0 | 1 |
|   |   |   |   | 0 | 0 | 1 | 1 | — | — | — | — | 1 | 0 | 0 | 0 | 1 |
|   |   |   |   | 1 | 1 | 0 | 1 | — | — | — | — | 0 | 0 | 1 | 1 | 0 |
|   |   |   |   | 1 | 1 | 0 | 0 | — | — | — | — | 0 | 1 | 1 | 0 | 1 |
|   |   |   |   | 1 | 1 | 1 | 1 | — | — | — | — | 0 | 0 | 1 | 0 | 0 |
| 0 | 1 | 0 | 0 | 0 | 0 | 0 | 1 | — | — | — | — | 1 | 1 | 1 | 1 | 1 |
|   |   |   |   | 0 | 0 | 0 | 0 | — | — | — | — | 0 | 0 | 1 | 1 | 1 |
|   |   |   |   | 0 | 0 | 1 | 1 | — | — | — | — | 1 | 0 | 0 | 0 | 1 |
|   |   |   |   | 1 | 1 | 0 | 1 | — | — | — | — | 0 | 0 | 1 | 1 | 0 |
|   |   |   |   | 1 | 1 | 0 | 0 | — | — | — | — | 0 | 1 | 1 | 0 | 1 |
|   |   |   |   | 1 | 1 | 1 | 1 | — | — | — | — | 0 | 0 | 1 | 0 | 0 |
| 0 | 0 | 0 | 1 | 0 | 1 | 0 | 0 | — | — | — | — | 1 | 1 | 1 | 1 | 1 |
|   |   |   |   | 0 | 0 | 0 | 0 | — | — | — | — | 0 | 0 | 1 | 0 | 1 |
|   |   |   |   | 0 | 0 | 1 | 1 | — | — | — | — | 1 | 0 | 0 | 0 | 1 |
|   |   |   |   | 1 | 1 | 0 | 0 | — | — | — | — | 0 | 0 | 1 | 1 | 0 |
|   |   |   |   | 1 | 1 | 1 |   | — | — | — | — | 0 | 0 | 1 | 0 | 0 |
| 0 | 0 | 1 | 1 | 1 | 1 | 0 | 0 | — | — | — | — | 1 | 1 | 1 | 1 | 1 |
|   |   |   |   | 1 | 1 | 1 | 1 | — | — | — | — | 0 | 0 | 1 | 0 | 0 |
| 1 | 1 | 0 | 1 | 0 | 1 | 1 | 1 | — | — | — | — | 1 | 1 | 1 | 1 | 1 |
|   |   |   |   | 0 | 0 | 1 | 1 | 0 | 0 | 0 | 1 | 0 | 0 | 1 | 0 | 1 |
|   |   |   |   |   |   |   |   | 0 | 1 | 0 | 1 | 1 | 0 | 0 | 0 | 1 |
|   |   |   |   | 1 | 1 | 1 | 1 | — | — | — | — | 0 | 0 | 1 | 0 | 0 |
| 1 | 1 | 0 | 0 | 0 | 0 | 1 | 1 | — | — | — | — | 1 | 1 | 1 | 1 | 1 |
|   |   |   |   | 1 | 1 | 1 | 1 | — | — | — | — | 0 | 0 | 1 | 0 | 0 |
| 1 | 1 | 1 | 1 | 1 | 1 | 1 | 1 | — | — | — | — | 0 | 0 | 1 | 0 | 0 |

The normal block code and the interdiction code thus converted are time-division-multiplexed and transmitted over the optical fiber 18. It is thus possible to separate the data signal and the arbitration signal from the optical signal.

The code converter 2b carries out a process which is a reversal of the process carried out by the code converter 2a. The code converter 2b comprises a block coder 16b for converting a normal code of an m-bit electric signal from the optical receiver 5 into an n-bit binary signal, a parallel-to-serial converter 17b for converting the n-bit binary signal from the block coder 16b into a serial signal, an encoder 14b for generating data (Data) and a strobe (Strb) of a data signal based on the serial signal from the parallel-to-serial converter 17b and a clock signal, an interdiction coder 15b for producing an n-bit binary signal of an interdiction code of the m-bit electric signal from the optical receiver 5, and a binary-to-ternary code converter 13b for converting the n-bit binary signal from the interdiction coder 15b into a ternary arbitration signal.

In the code converter 2b, the m-bit electric signal from the optical receiver 5 is supplied simultaneously to the interdiction coder 15b and the block coder 16b. When an interdiction code is received, the block coder 16b produces no signal. When a normal code is received, the interdiction coder 15b produces no signal.

When a normal code is received, the m-bit binary signal produced by the block coder 16b is converted into a serial signal by the parallel-to-serial converter 17b. The encoder 14b generates data (Data) and a strobe (Strb) from the serial signal and the clock signal. When an interdiction code is received, the n-bit binary signal produced by the interdiction coder 15b is converted into a ternary arbitration signal by the binary-to-ternary code converter 13b. The ternary arbitration signal thus produced and a binary data signal are time-division-multiplexed and transmitted over the twisted pairs 12a, 12b.

A network which employs the above optical transmitter/receiver will be described below.

Figure 6:
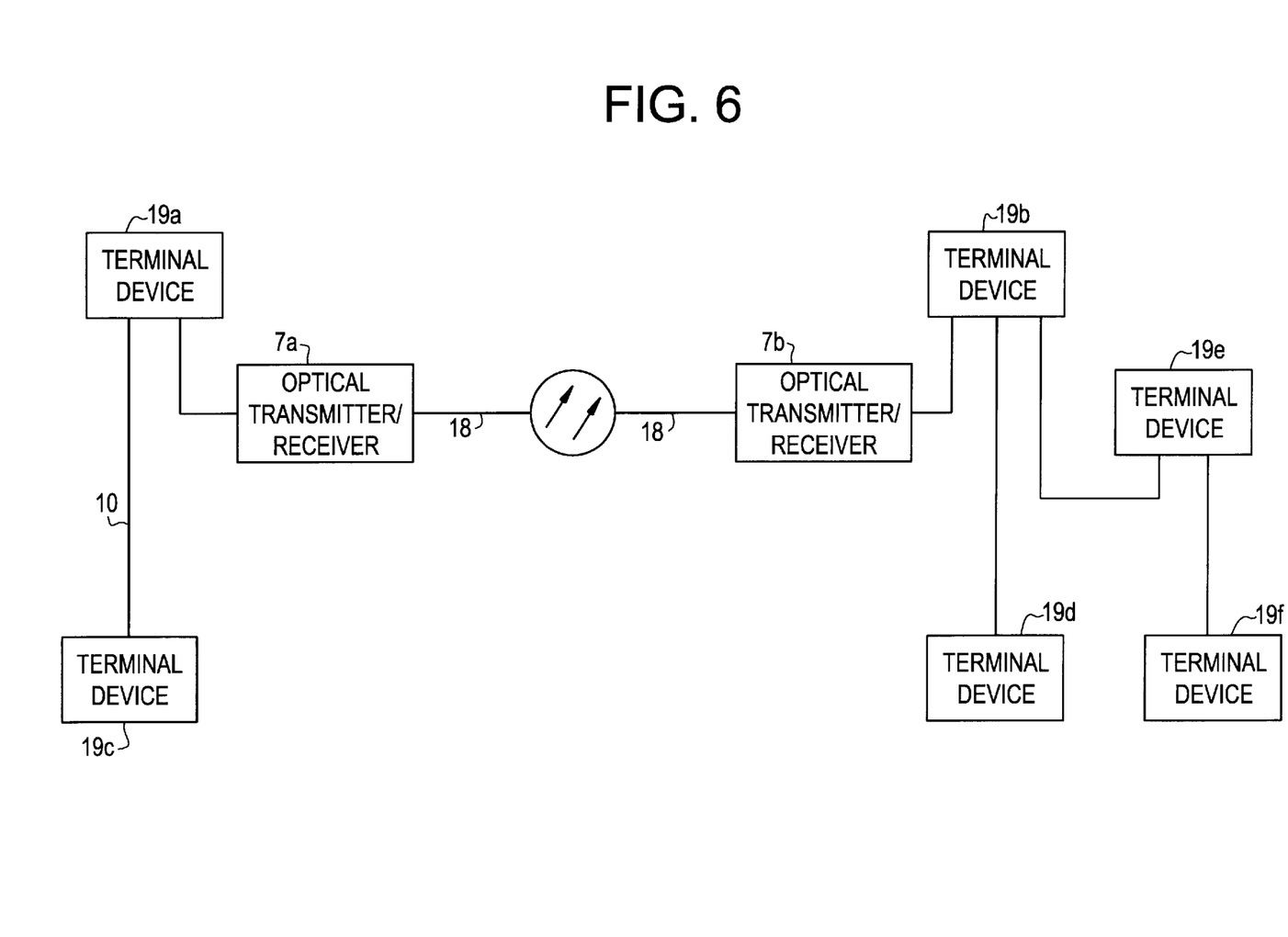
FIG. 6 is a block diagram of a network which employs optical transmitter/receivers according to the present invention.

FIG. 6 shows in block form such a network which employs optical transmitter/receivers according to the present invention. As shown in FIG. 6, terminal devices 19a~19f operate with electric energy supplied from a commercial power supply, and have serial bus interfaces comprising twisted pairs. The terminal device 19a is connected to an optical transmitter/receiver 7a and the terminal device 19c by twisted pair cables 10 with feeder lines. The terminal device 19b is connected to an optical transmitter/receiver 7b and the terminal devices 19d, 19e by twisted pair cables 10 with feeder lines. The terminal device 19e is connected to the terminal device 19f by a twisted pair cable 10 with a feeder line. The optical transmitter/receivers 7a, 7b are interconnected by an optical fiber 18 for optical communications between the terminal devices 19a, 19b.

Figure 7:
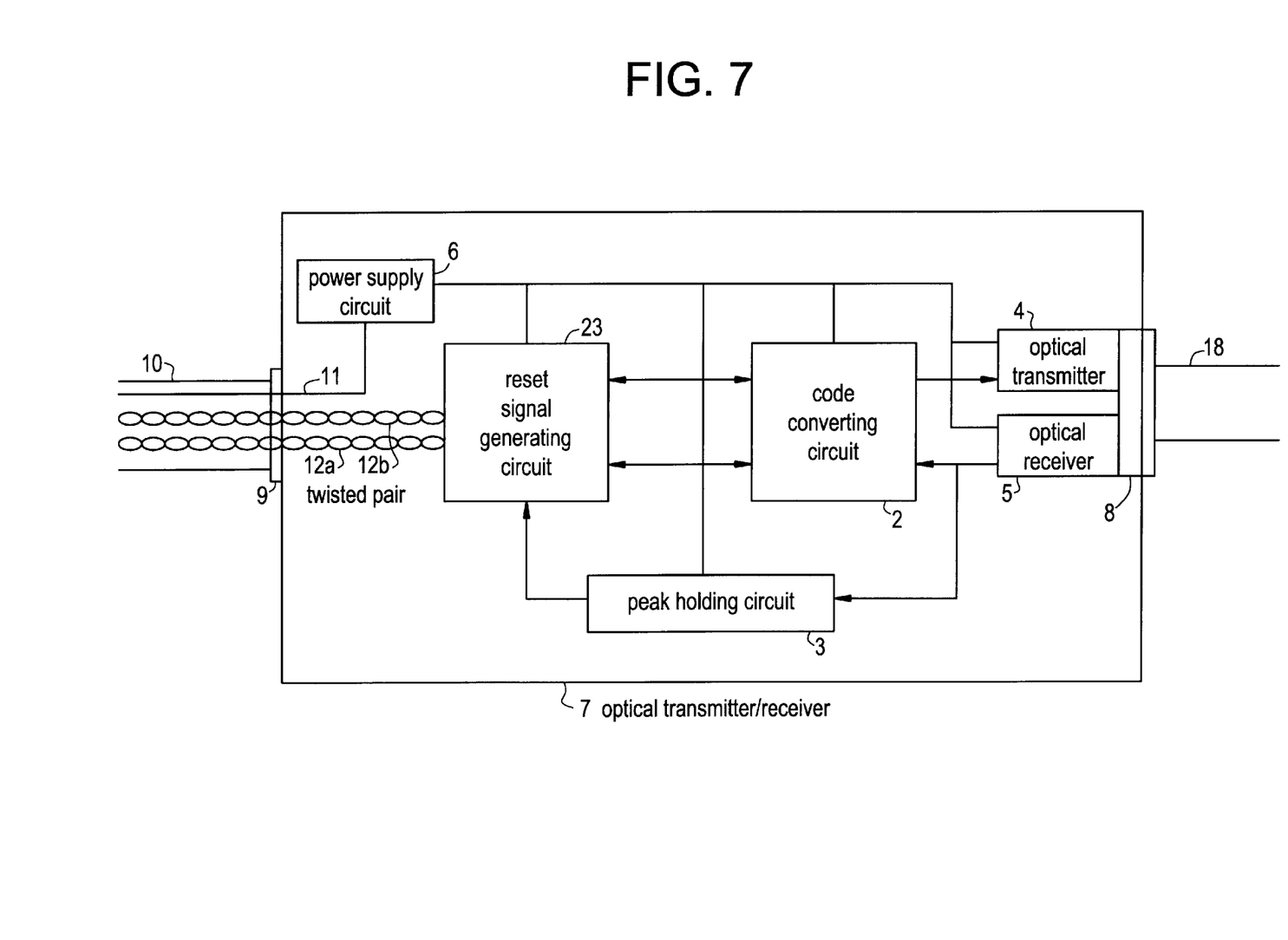
FIG. 7 is a block diagram of an optical transmitter/receiver according to a third embodiment of the present invention.

The optical transmitter/receiver 7a is supplied with a DC voltage from the terminal device 19a through a feeder line 11 (see FIG. 7). The supplied DC voltage is converted by a power supply circuit therein into a predetermined drive voltage, which is supplied to the biasing circuit, the code converting circuit, the peak holding circuit, the optical transmitter, and the optical receiver. Similarly, the optical transmitter/receiver 7b is supplied with a DC voltage from the terminal device 19b, and the supplied DC voltage is converted into a predetermined drive voltage, which is supplied to the various components of the optical transmitter/receiver 7b.

When the terminal device 19f is separated from the network, its separation is detected by the terminal device 19e, which produces a ternary reset signal as an arbitration signal. The terminal device 19b receives the ternary reset signal from the terminal device 19e, and transmits the received ternary reset signal to the optical transmitter/receiver 7b.

In the optical transmitter/receiver 7b, the code converting circuit 2 converts a two-sequence ternary signal into a one-sequence binary signal according Tables 2 and 3, shown above, and transmits the one-sequence binary signal as an optical signal over the optical fiber 18. The transmitted optical signal is then received by the optical receiver of the optical transmitter/receiver 7a. In the optical transmitter/receiver 7a, the code converting circuit 2 converts the one-sequence binary signal into a two-sequence ternary signal, and transmits the two-sequence ternary signal over the twisted pairs 12a, 12b. The transmitted two-sequence ternary signal is then received by the terminal device 19a.

When the twisted pairs which have connected the terminal device 19b and the optical transmitter/receiver 7b to each other are removed, the supply of electric energy to the optical transmitter/receiver 7b is stopped, and hence the optical transmitter/receiver 7b is shut off. Therefore, no optical signal is present in the optical fiber 18, and the optical transmitter/receiver 7a operates as follows:

The output signal from the optical receiver 5 of the optical transmitter/receiver 7a becomes nil, and hence the output signal of the peak holding circuit 3 thereof also becomes nil. When the output signal of the peak holding circuit 3 becomes nil, the switch SW1 (see FIG. 4) controlled by the output signal from the peak holding circuit 3 is opened, applying no bias voltage to the twisted pair 12a.

When the terminal device 19a detects no bias voltage applied to the twisted pair 12a, it generates a reset signal. Upon separation of the optical transmitter/receiver 7b, the terminal device 19b detects a change in the bias voltage applied to the twisted pair 12a, and generates a reset signal. The entire network is now separated into a network comprising the terminal devices 19a, 19c and a network comprising the terminal devices 19b, 19d, 19f, and each of the networks is initialized.

2nd Embodiment:

In the first embodiment, the peak holding circuit 3 is used to detect an optical signal, and produces an output signal for controlling the biasing circuit 1. However, the biasing circuit 1 may be controlled by a counter circuit.

The counter circuit normally runs freely, and when there is an output signal from the optical receiver 5, the counter circuit is reset by the output signal from the optical receiver 5. Insofar as there is an output signal from the optical receiver 5, the counter circuit is reset thereby. In the absence of an output signal from the optical receiver 5, the counter circuit effects its counting process. When the count of the counter circuit reaches a predetermined signal determining time T, the counter circuit produces an output signal to control the biasing circuit 1. The counter circuit can thus control the biasing circuit 1 in the same manner as with the optical transmitter/receiver according to the first embodiment.

Since operation of the peak holding circuit 3 largely depends on the transmission rate of signals, it is advantageous to use a counter circuit for detecting signals if a signal mark ratio is low, i.e., if a no-signal condition is long.

The optical transmitter/receiver with the counter circuit is also effective to detect insertion and removal of twisted pairs with feeder lines and an optical fiber, allowing the network to be initialized.

3rd Embodiment:

FIG. 7 shows in block form an optical transmitter/receiver according to a third embodiment of the present invention. The optical transmitter/receiver according to the third embodiment is similar to the optical transmitter/receiver according to the first embodiment except that the biasing circuit 1 is replaced with a reset signal generating circuit 23. Those parts in FIG. 7 which are identical to those shown in FIG. 3 are denoted by identical reference numerals, and will not be described in detail below.

A bias voltage is applied to the twisted pair cable 10 so that a terminal device by detecting a configurational change in the network upon insertion or removal of the twisted pair cable 10 produces a reset signal to allow the network to be initialized. The optical transmitter/receiver according to the third embodiment has a reset signal generating circuit 23 for generating such a reset signal. The reset signal generating circuit 23 is controlled by the peak holding circuit 3 which detects an output signal produced by the optical receiver 5. Specifically, when there is no output signal from the optical receiver 5, the reset signal generating circuit 23 is operated to generate a reset signal for a preset period of time. The terminal device that receives the reset signal is reset, starting to initialize the network. The bias voltage is normally applied to the twisted pair cable 10 at the optical transmitter/receiver or the terminal device.

The optical transmitter/receiver according to the third embodiment is also effective to detect insertion and removal of twisted pairs with feeder lines and an optical fiber, allowing the network to be initialized.

The peak holding circuit 3 in the optical transmitter/receiver according to the third embodiment may be replaced with a counter circuit according to the second embodiment.

The optical transmitter/receiver according to the present invention may be integrally combined with the optical fiber 18 or the twisted pair cable 10, and may be installed in a terminal device for an optical interfacing capability.

It is to be understood that variations and modifications of the optical transmitter/receivers disclosed herein will be evident to those skilled in the art. It is intended that all such modifications and variations be included within the scope of the appended claims.

What is claimed is:

1. An optical transmitter/receiver comprising:

an electric connector means connected to a terminal device by a twisted pair cable with a feeder line;

an optical transmitter means for converting an electric signal, received from the terminal device via said twisted pair cable, into an optical signal, and transmitting the optical signal over an optical fiber;

an optical receiver means for converting an optical signal received through the optical fiber into a second electric signal, and transmitting the second electric signal over the twisted pair cable to said terminal device;

optical signal detecting means for detecting whether there is an optical signal in said optical fiber and outputting a signal indicative of said detecting; and signal line insertion/removal indicating means for detecting insertion and removal of either or both said optical fiber or said twisted pair cable, based on said signal output from said optical signal detecting means, and for indicating the detected insertion or removal of said optical fiber or said twisted pair cable to the terminal device.

2. An optical transmitter/receiver according to claim 1, wherein said signal line insertion/removal indicating means comprises a biasing circuit for applying a bias voltage to a twisted pair of said twisted pair cable if there is an optical signal in said optical fiber and stopping the application of the bias voltage to the twisted pair if there is no optical signal in said optical fiber.

3. An optical transmitter/receiver comprising:
- an electric connector means connected to a terminal device by a twisted pair cable with a feeder line;
- an optical transmitter means for converting an electric signal received via said twisted pair cable from the terminal device into an optical signal and transmitting the optical signal over an optical fiber;
- an optical receiver means for converting an optical signal received through the optical fiber into an electric signal and transmitting the electric signal over the twisted pair cable;
- optical signal detecting means for detecting whether there is an optical signal in said optical fiber; and
- signal line insertion/removal indicating means for detecting insertion or removal of said optical fiber or said twisted pair cable based on a detected signal from said optical signal detecting means, and indicating the detected insertion or removal to the terminal device,
- wherein said signal line insertion/removal indicating means comprises a reset signal generating circuit for generating and applying a reset signal to a twisted pair of said twisted pair cable if there is no optical signal in said optical fiber.

4. An optical transmitter/receiver according to claim 1, wherein said optical signal detecting means comprises a peak holding circuit for detecting whether there is an optical signal in said optical fiber based on the electric signal converted from the optical signal received through the optical fiber.

5. An optical transmitter/receiver according to claim 1, wherein said optical signal detecting means comprises a counter circuit which is resettable if there is an optical signal in said optical fiber based on the electric signal converted from the optical signal received through the optical fiber, and which effects counting operation if there is no optical signal in said optical fiber and produces an output signal indicating that there is no optical signal in said optical fiber when a count thereof reaches a preset value.

6. An optical transmitter/receiver according to claim 1, further comprising means for generating a drive voltage based on a DC voltage which is supplied through the feeder line of the twisted pair cable from the terminal device.

7. An optical transmitter/receiver comprising:
- an electric connector means connected to a terminal device by a twisted pair cable with a feeder line;
- an optical transmitter means for converting an electric signal from the terminal device into an optical signal and transmitting the optical signal over an optical fiber;
- an optical receiver means for converting an optical signal received through the optical fiber itno an elctric signal and transmitting the electric signal over the twisted pair cable;
- optical signal detecting means for detecting whether there is an optical signal in said optical fiber;
- signal line insertion/removal indicating means for detecting insertion or removal of said optical fiber or and for detecting insertion and removal of said twisted pair cable based on a detected said signal output from said optical signal detecting means and for indicating the detected insertion or removal of said optical fiber or said twisted pair cable to the terminal device; and
- means for converting a two-sequence signal supplied through the twisted pair cable into a one-sequence optical signal for transmission over the optical fiber, and means for converting the optical signal received through the optical fiber into a one-sequence electric signal and converting the one-sequence electric signal into a two-sequence electric signal for conversion over a twisted pair of the twisted pair cable.

8. A network comprising first and second terminal devices each having an optical transmitter/receiver according to claim 1, for optical communications between the first and second terminal devices.

9. A network according to claim 8, wherein the network is initialized depending on insertion or removal of a signal line as detected by said optical transmitter/receiver.

10. A network comprising first and second terminal devices each having an optical transmitter/receiver according to claim 2, for optical communications between the first and second terminal devices.

11. A network according to claim 10, wherein the network is initialized depending on insertion or removal of a signal line as detected by said optical transmitter/receiver.

12. A network comprising first and second terminal devices each having an optical transmitter/receiver according to claim 3, for optical communications between the first and second terminal devices.

13. A network according to claim 12, wherein the network is initialized depending on insertion or removal of a signal line as detected by said optical transmitter/receiver.

14. A network comprising first and second terminal devices each having an optical transmitter/receiver according to claim 4, for optical communications between the first and second terminal devices.

15. A network according to claim 14, wherein the network is initialized depending on insertion or removal of a signal line as detected by said optical transmitter/receiver.

16. A network comprising first and second terminal devices each having an optical transmitter/receiver according to claim 5, for optical communications between the first and second terminal devices.

17. A network according to claim 16, wherein the network is initialized depending on insertion or removal of a signal line as detected by said optical transmitter/receiver.

18. A network comprising first and second terminal devices each having an optical transmitter/receiver according to claim 6, for optical communications between the first and second terminal devices.

19. A network according to claim 18, wherein the network is initialized depending on insertion or removal of a signal line as detected by said optical transmitter/receiver.

20. A network comprising first and second terminal devices each having an optical transmitter/receiver according to claim 7, for optical communications between the first and second terminal devices.

21. A network according to claim 20, wherein the network is initialized depending on insertion or removal of a signal line as detected by said optical transmitter/receiver.

22. An optical transmitter/receiver comprising:
- an electric connector which is connected to a terminal device by a twisted pair cable with a feeder line;
- an optical transmitter which converts an electric signal, received from the terminal device via said twisted pair cable, into an optical signal, and transmits the optical signal over an optical fiber;
- an optical receiver which converts an optical signal received through the optical fiber into a second electric signal, and transmits the second electric signal over the twisted pair cable to said terminal device;
- an optical signal detector which detects whether there is an optical signal in said optical fiber and outputs a signal indicative of said detecting; and a signal line insertion/removal indicator which detects insertion removal of either or both said optical fiber or said twisted pair cable, based on said signal output from said optical signal detector, and indicates the detected insertion or removal of said optical fiber or said twisted pair cable to the terminal device.

* * * * *